(12) United States Patent
Dale et al.

(10) Patent No.: US 8,856,453 B2
(45) Date of Patent: Oct. 7, 2014

(54) PERSISTENT PREFETCH DATA STREAM SETTINGS

(75) Inventors: Jason N. Dale, Austin, TX (US); Miles R. Dooley, Austin, TX (US); Richard J. Eickemeyer, Rochester, MN (US); Bradly G. Frey, Austin, TX (US); Yaoqing Gao, North York (CA); Francis P. O'Connell, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/410,260

(22) Filed: Mar. 1, 2012

(65) Prior Publication Data

US 2013/0232320 A1  Sep. 5, 2013

(51) Int. Cl.
*G06F 12/08* (2006.01)

(52) U.S. Cl.
USPC .................... 711/137; 711/122; 711/E12.057

(58) Field of Classification Search
USPC .................................. 711/137, 122, E12.057
See application file for complete search history.

(56) References Cited

U.S. PATENT DOCUMENTS

| | | | |
|---|---|---|---|
| 6,460,115 B1 | 10/2002 | Kahle et al. | |
| 6,519,685 B1 | 2/2003 | Chang | |
| 6,560,681 B1 | 5/2003 | Wilson et al. | |
| 6,810,466 B2 | 10/2004 | Henry et al. | |
| 7,080,211 B2 | 7/2006 | Hooker | |
| 7,240,163 B2 | 7/2007 | Henry et al. | |
| 7,383,394 B2 | 6/2008 | Henry et al. | |
| 7,716,427 B2 | 5/2010 | Griswell, Jr. et al. | |
| 2006/0179239 A1 | 8/2006 | Fluhr et al. | |
| 2010/0281220 A1 | 11/2010 | Cantin et al. | |

OTHER PUBLICATIONS

Wang, Zhenlin et al., "Using the Compiler to Improve Cache Replacement Decisions", PACT '02 Proceedings of the 2002 International Conference on Parallel Architectures and Compilation Techniques http://citeseerx.ist.psu.edu/viewdoc/summary?doi=10.1.1.8.9890 (Obtained from the Internet on Feb. 27, 2012) 2002 , 10 pages.

*Primary Examiner* — Yong Choe
(74) *Attorney, Agent, or Firm* — DeLizio Gilliam, PLLC (57) ABSTRACT

A prefetch unit includes a transience register and a length register. The transience register hosts an indication of transient for data stream prefetching. The length register hosts an indication of a stream length for data stream prefetching. The prefetch unit monitors the transience register and the length register. The prefetch unit generates prefetch requests of data streams with a transient property up to the stream length limit when the transience register indicates transient and the length register indicates the stream length limit for data stream prefetching. A cache controller coupled with the prefetch unit implements a cache replacement policy and cache coherence protocols. The cache controller writes data supplied from memory responsive to the prefetch requests into cache with an indication of transient. The cache controller victimizes cache lines with an indication of transient independent of the cache replacement policy.

20 Claims, 5 Drawing Sheets

PERSISTENT PREFETCH DATA STREAM SETTINGS

BACKGROUND

Embodiments of the inventive subject matter generally relate to the field of computer architecture, and, more particularly, to persistent prefetch settings for data streams.

The available memory bandwidth in a multiprocessor system is shared among all of the processors on a chip, and is a limiting factor for performance of data intensive applications. Ensuring that the available memory bandwidth is conserved for useful work helps maximize total performance of the chip. The available memory bandwidth can be conserved by altering the state of cache lines that are anticipated to be used only once such that the cache lines are replaced sooner than a default replacement policy. Existing techniques include defining a data stream and assigning a transient property to the cache lines of the data stream.

Along with conserving available memory bandwidth, performance of a certain thread running on any one processor is also significant. The performance of a thread can be improved by employing aggressive hardware-based data prefetching. In aggressive hardware-based data prefetching, a hardware prefetcher detects a data stream and begins prefetching data for the detected stream beginning with the next line and prefetching up to a predetermined number of cache lines ahead of the data currently being processed. However, aggressive data prefetching can lead to overshoot (i.e., prefetching a number of cache lines more than required), which results in wasted memory bandwidth.

SUMMARY

Embodiments of the inventive subject matter include a system with a processor core, cache, a transience register, a length register, a prefetch unit, and a cache controller. The transience register hosts an indication of transient for data stream prefetching. The length register hosts an indication of a stream length for data stream prefetching. The prefetch unit monitors the transience register and the length register. The prefetch unit generates prefetch requests of data streams with a transient property up to the stream length limit when the transience register indicates transient and the length register indicates the stream length limit for data stream prefetching. The cache controller is coupled with the prefetch unit. The cache controller implements a cache replacement policy and cache coherence protocols. The cache controller writes data supplied from memory responsive to the prefetch requests into the cache with an indication of transient. The cache controller victimizes cache lines with an indication of transient independent of the cache replacement policy.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to storing a transient property for cache lines of data streams to be prefetched and a stream length limit for data streams to be prefetched, embodiments are not so limited. The transient property for cache lines of the data streams to be prefetched may be indicated by a variable stored in a block of memory in a prefetch unit, by a bit in an existing register (e.g., a general purpose register), or by any other special purpose register. Similarly, the stream length limit for the data streams to be prefetched may be indicated by a variable stored in a block of memory in the prefetch unit, by a bit in an existing register, or by any other special purpose register. In other instances, well-known instruction instances, protocols, structures and techniques have not been shown in detail in order not to obfuscate the description.

This description uses the term "memory" to refer to cache memory and to refer to main memory. Hence, a "memory controller" can be a cache controller or a main memory controller.

A transience register and a length register are architected into a prefetch unit in a microprocessor system. A prefetch engine associates a transient attribute with prefetch requests for data streams based on the transience register. The prefetch engine associates the transient attribute with prefetch requests for data streams when a transient bit in the transience register is set. The transient attribute persists in the prefetch requests for all data streams until the transient bit is reset. A stream may be defined as any sequence of storage accesses that reference a set of cache lines in a monotonically increasing or decreasing manner, regardless of whether those cache lines host operand data or instruction data (i.e., instructions). A data stream is a stream comprised of data cache lines and can be a hardware-acquired data stream or a software-defined data stream. A hardware data stream prefetcher monitors the memory access patterns of a running program and acquires data streams based on a prediction of the data to be accessed by the program. A software-defined data stream is specified by program instructions inserted by a compiler or a programmer into the program. The stream length for the data stream may be defined as the number of cache lines referenced by the data stream. The length register includes a stream length field to indicate a stream length limit (i.e., an upper limit on the number of cache lines of a data stream) for data streams to be prefetched. The prefetch engine associates the transient attribute with a prefetch request by inserting a transience parameter (e.g., transience=1, transience=true, etc.) in the prefetch request for a cache line of a data stream. The prefetch engine reads the value of the stream length field from the length register and stops generating prefetch requests for a data stream when prefetch requests for a number of cache lines equal to the value of the stream length field are generated. The stream length limit persists for all data streams prefetched by the prefetch engine until the value of the stream length field is reset.

Figure 1:
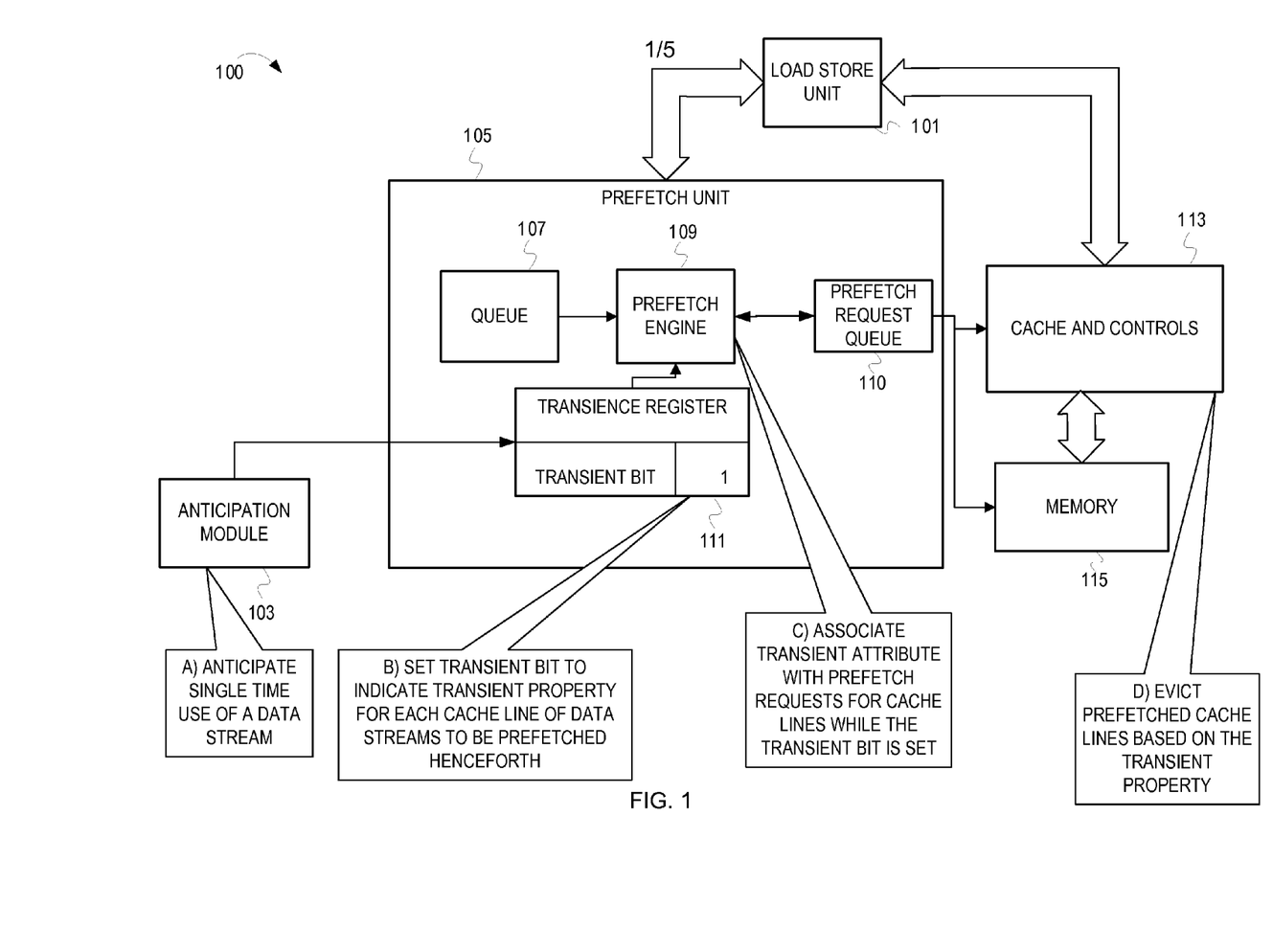
FIG. 1 depicts an example conceptual diagram of selected components of a microprocessor system for setting prefetch data streams to be cache transient using a transience register.

FIG. 1 depicts an example conceptual diagram of selected components of a microprocessor system for setting prefetch data streams to be cache transient using a transience register. FIG. 1 depicts a microprocessor system 100 including a prefetch unit 105, an anticipation module 103, a load store unit 101, cache and controls 113 and a memory 115. The prefetch unit 105 includes a queue 107, a prefetch engine 109, a prefetch request queue 110 and a transience register 111. The prefetch engine 109 in the prefetch unit 105 performs operations to detect streams and to generate prefetch requests for cache lines that comprise those streams. The prefetch requests include requests for blocks of data from the memory 115 or one of the caches (e.g., cache and controls 113) in a memory hierarchy. The cache and controls 113 may be cache and controls for any level of cache in the microprocessor system 100 (e.g., L1 cache, L2 cache, etc.). The cache and controls 113 include a cache with controls for operations like implementing cache replacement policies, cache hit/miss update requests, etc. The memory 115 is the next higher level memory to the cache and controls 113 in the memory hierarchy. The load store unit 101 includes a pipelined execution unit to retrieve data from and store data to the memory hierarchy of the microprocessor system 100. Although not depicted in the figure, the prefetch unit 105 may be embodied in the load store unit 101. The queue 107 in the prefetch unit 105 buffers addresses generated by the load store unit 101. The prefetch request queue 110 in the prefetch unit 105 includes stream registers to store parameters of data streams. The transience register 111 in the prefetch unit 105 indicates to the prefetch engine 109 to associate a transient attribute with the prefetch requests for data streams. The transience register 111 includes a transient bit. The transience register 111 is accessible at least for write access by the particular instructions generated by the anticipation module 103. The prefetch engine 109 reads the transient bit to determine whether the transient attribute is to be associated with the prefetch requests. The prefetch engine 109 writes the prefetch requests to the prefetch request queue 110 which are sent to prefetch data blocks from the memory 115 or one of the caches in the memory hierarchy. Multiple levels of caches in the memory hierarchy are checked for availability of the data blocks before the data blocks are prefetched from the memory 115.

The anticipation module 103 generates program instructions to set or reset the transient bit. The anticipation module 103 can be a compiler or program code that anticipates single use of data streams consumed by an application program, within a given window of time and/or number of instructions. The anticipation module 103 can also be one or more components of a hardware data stream prefetcher where the components anticipate single use of data streams. Although the data stream may be accessed multiple times in a run or runs of one or more program(s), the data stream is accessed a single time before the data stream is evicted from a cache due to the limited size of the cache and the cache space is yielded to other data and/or instructions. FIG. 1 depicts interactions between the components of the microprocessor system 100 in a sequence of stages A through D.

At stage A, the anticipation module 103 anticipates single use of a data stream. For example, the anticipation module 103 is a compiler. The compiler examines data access patterns of an application program to determine expected data to be utilized by the application program. The compiler further determines that certain data to be utilized by the application program will be read only once from memory before it is likely to be displaced from cache. The compiler identifies the data stream corresponding to the data to be read in the same manner. The compiler inserts set and reset instructions into the application program based on the knowledge of application program access patterns. In some embodiments, the anticipation module 103 is a set of program instructions within the application program to anticipate single use of data streams. Hence, a developer inserts the set and reset transience instructions based on knowledge of cache size and the application program access patterns. Although not depicted in the figure, the anticipation module 103 may be interfaced to the load store unit 101 and/or the queue 107 to receive information for anticipating single use of data streams. Embodiments are not limited to the anticipation module 103 anticipating a single use of data streams. Embodiments can have the anticipation module 103 anticipate the use of data streams for less than or equal to a certain number of times specified by the program settings of the application program. For example, the anticipation module 103 sets the transient bit for data streams that are to be evicted after they are accessed twice from a cache. The cache maintains history information about access of the cache lines using a counter and the transient property for the cache lines is set after the second access.

At stage B, the anticipation module 103 sets the transient bit to indicate a transient property for each cache line of data streams to be prefetched henceforth. The anticipation module 103 can interact with the components of the prefetch unit 105 to determine when the prefetch engine 109 starts generating prefetch requests for certain data streams to be utilized by the application program. The anticipation module 103 generates a program instruction to set the transient bit in the transience register 111. The single program instruction to set the transient bit reduces the programming effort for setting the transient property for all cache lines of one or more data streams. The single program instruction allows a developer to omit program instructions for setting the transient property for multiple data streams. The single program instruction also reduces execution time and processing overhead in the execution of the program. The single program instruction further indicates to the prefetch engine 109 that the transient property is a default property for ensuing data streams. In some embodiments, the transience register 111 includes a single transient bit for hardware-acquired data streams and software-defined data streams. In other implementations, the transience register 111 includes separate transient bits for the hardware-acquired data streams and the software-defined data streams. The anticipation module 103 can modify the appropriate bit in the transience register 111 to indicate to the prefetch engine 109 about the transient property of cache lines of the respective data streams (i.e., hardware-acquired data streams or software-defined data streams). Separate bits in the transience register 111 for hardware-acquired data streams and software-defined data streams allow designation of cache lines of data streams as transient in an efficient and flexible manner.

At stage C, the prefetch engine 109 associates the transient attribute with prefetch requests for cache lines while the transient bit is set. For example, the prefetch engine 109 inserts a transience parameter (transience=1) in the prefetch requests for cache lines to associate the transient attribute with the prefetch requests. The prefetch engine 109 monitors the status of the transient bit in the transience register 111. While the transient bit is set, the prefetch engine 109 inserts the transience parameter in all prefetch requests generated by the prefetch engine 109. The prefetch engine 109 can also associate the transient attribute with a prefetch request by inserting or modifying a logical expression, a flag, etc., in the prefetch request to indicate that a transient property is to be set for a prefetched cache line. On identifying the transient attribute in a prefetch request, the memory 115 returns the cache line with an associated transient attribute (e.g., a bit set in the metadata of the cache line). Alternatively, the cache line may be returned by one of the caches in the memory hierarchy, and would likewise be returned with an associated transient attribute.

The cache and controls 113 set the transient property for a cache line on identifying the transient attribute associated with a prefetched cache line. For example, a cache controller in the cache and controls 113 reads the transient attribute and sets the transient property for a cache line when the cache line is written into the cache. The cache and controls 113 can set the transient property for a cache line in multiple ways. For example, the cache and controls 113 set the transient property for a cache line using a transient flag. The cache and controls 113 set a value for the transient flag to set the transient property for the cache line. The cache and controls 113 can also set the transient property for a cache line using one or more transient bits. Cache lines can be prefetched from levels of caches in the memory hierarchy. The transient property of a cache line persists when the cache line is prefetched across multiple levels of caches in the memory hierarchy. For example, when a cache line is prefetched into L3 cache with the transient property and later prefetched into L2 cache from L3 cache, the transient property of the cache line is retained on prefetching into L2 cache. Also, programmatic loads of a cache line with the transient property do not change the transient property of the cache line. For example, when a prefetched cache line with the transient property is accessed by an application program, the state of the cache line is not updated in accordance with a standard cache replacement policy and the transient property of the cache lines persists. Although, the standard cache replacement policy specifies not to victimize a recently used cache line, the transient property of the cache line persists and the cache line is victimized for replacement. Examples of standard cache replacement policies include Least Recently Used (LRU), Most Recently Used (MRU), etc.

At stage D, the cache and controls 113 evict prefetched cache lines based on the transient property of cache lines. The cache and controls 113 replace the cache lines with the transient property when new cache lines are prefetched into the cache and controls 113. The cache and controls 113 victimize the cache lines with the transient property for replacement earlier than specifications of a standard cache replacement policy. A standard replacement policy may include one or more of the cache replacement algorithms (e.g., Least Recently Used (LRU), Pseudo-LRU, Random Replacement (RR), etc.). For example, the Least Recently Used algorithm specifies a replacement of cache lines that were least used recently. However, when a cache line with the transient property is available, the cache line with the transient property is evicted first instead of the least recently used cache line. In some embodiments, the cache and controls 113 evict a prefetched cache line with the transient property only on the basis of the transient property. Replacement of cache lines on the basis of the transient property of cache lines allows replacement of certain cache lines (e.g., cache lines which would be replaced before they are accessed the second time due to limited size of the cache) without affecting other cache lines. For example, when cache lines are victimized for replacement, the cache lines of a particular data stream consumed by an application program are replaced. The replacement of cache lines of a specific data stream allows cache lines to be replaced in an efficient manner, which reduces the number of cache misses when the cache is accessed by other application programs or by the application program making other data requests.

Figure 2:
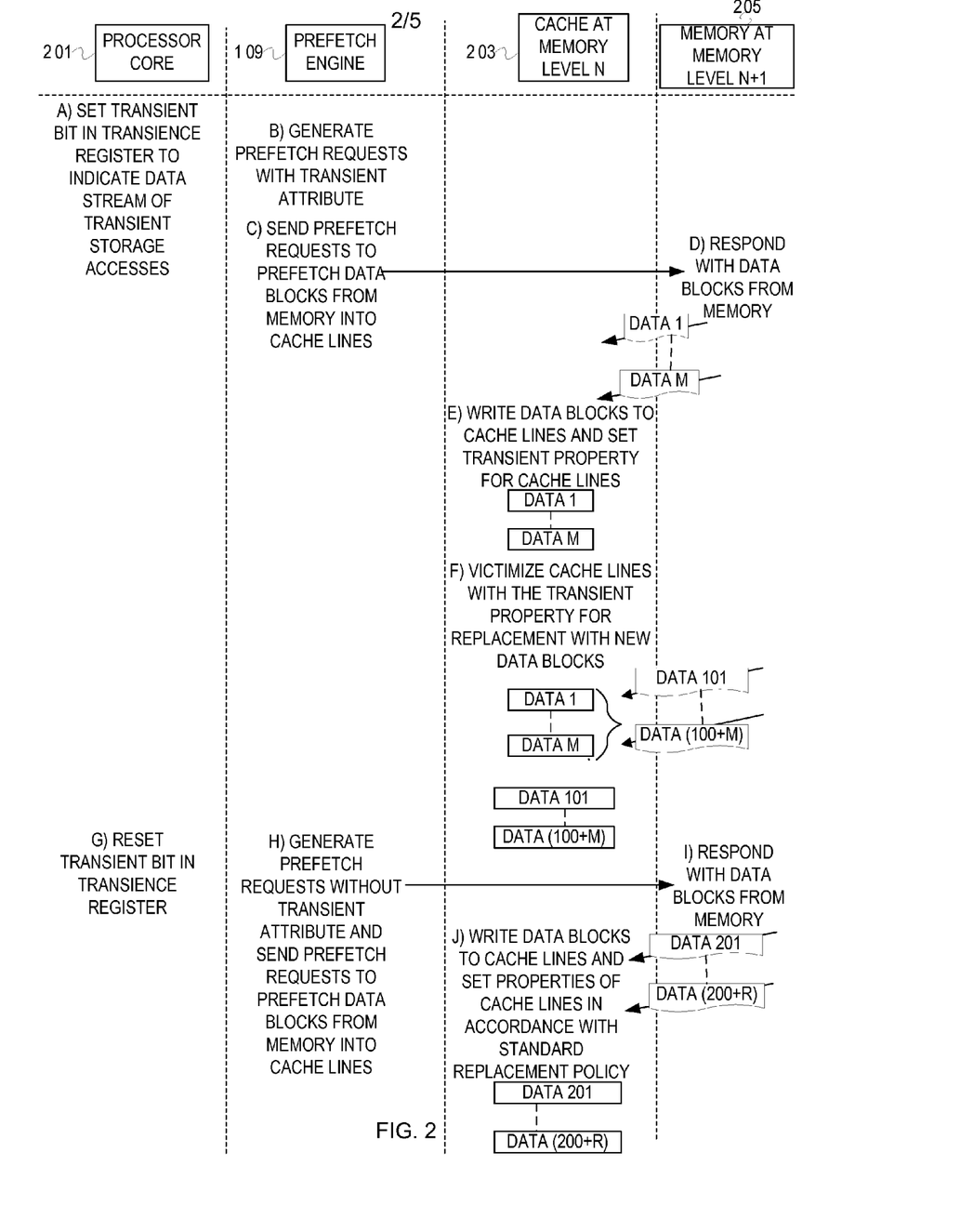
FIG. 2 depicts an example sequence diagram of interaction between components of a microprocessor system for setting a transient property for cache lines of prefetch data streams.

FIG. 2 depicts an example sequence diagram of interaction between components of a microprocessor system for setting a transient property for cache lines of prefetch data streams. FIG. 2 includes multiple entities including a processor core 201, a prefetch engine 109, a cache at memory level N 203 and a memory at memory level N+1 205. The processor core 201 includes components of a microprocessor (e.g., integrated circuits, registers, etc.) to execute program instructions. In the depicted embodiment, the processor 201 executes a program instruction to set a transient bit in a transience register. The prefetch engine 109 performs operations to generate prefetch requests for the cache at memory level N 203. The cache memory at level N 203 includes a cache with controls for implementing cache replacement policies, cache coherence protocols, etc. The memory at memory level N+1 205 may be another cache or main memory. The memory at memory level N+1 205 is one level higher to the cache memory at level N 203 in the memory hierarchy. FIG. 2 depicts interactions between the components of the microprocessor system in a sequence of stages A through J. Stages A through F depict interactions between the components of the microprocessor system when the transient bit in the transience register is set. Stages G through J depict interactions between components of the microprocessor system when the transient bit in the transience register is reset.

At stage A, the processor core 201 sets the transient bit in the transience register to indicate data streams of transient storage accesses. For example, the processor core 201 executes a program instruction to set the transient bit. The data streams of transient storage accesses imply that data can be victimized from a cache after a single hit in the cache. Embodiments can implement the transience register with a not transient bit. In such an implementation, the processor core 201 indicates to the prefetch engine 109 to generate prefetch requests for cache lines of the data streams with the transient attribute by resetting the not transient bit.

At stage B, the prefetch engine 109 generates prefetch requests for cache lines with the transient attribute. For example, the prefetch engine 109 inserts a transience parameter in the prefetch requests to generate prefetch requests for cache lines with the transient attribute. The prefetch engine 109 monitors the state of the transient bit in the transience register to determine whether to attach the transient attribute with the prefetch requests for cache lines of one or more data streams.

At stage C, the prefetch engine 109 sends prefetch requests to prefetch data blocks from the memory at memory level N+1 205 into cache lines of the cache at memory level N 203. The prefetch engine 109 writes prefetch requests to a prefetch request queue which sends prefetch requests to prefetch blocks of data from the memory N+1 205. The prefetch engine request queue can send multiple prefetch requests to the memory at memory level N+1 205 at the same time. In the depicted embodiment, the prefetch request queue sends prefetch requests to prefetch M data blocks (Data 1 to Data M). Although depicted as occurring in sequence, the operations of stages B and C can occur in parallel. For example, the prefetch request queue does not wait to send prefetch requests to the memory at memory level N+1 205 until all prefetch requests have been generated. The prefetch request queue can send one or more prefetch requests to the memory at memory level N+1 205 as the prefetch requests are generated.

At stage D, the memory at memory level N+1 205 responds with data blocks. The memory at memory level N+1 205 sends the data blocks to the cache at memory level N 203. The data blocks sent by the memory at memory level N+1 205 include the transient attribute. For example, the data blocks include the transient attribute as a transient flag set in the metadata of the data blocks. The memory at memory level N+1 205 may respond with one or more data blocks at the same time. In the depicted embodiment, the memory at memory level N+1 205 responds with M data blocks (Data 1 to Data M) at the same time.

At stage E, the cache at memory level N 203 writes data blocks to cache lines and sets a transient property for the cache lines. The cache at memory level N 203 determines the transient property for the cache lines on identifying the transient attribute associated with the data blocks (Data 1 to Data M). For example, the cache at memory level N 203 reads the metadata of the data blocks to identify the transient attribute associated with the data blocks. The cache at memory level N 203 writes the data blocks (Data 1 to Data M) to M cache lines (Data 1 to Data M). The cache at memory level N 203 can set the transient property for M cache lines using one or more transient bits, a transient flag, etc.

At stage F, the cache at memory level N 203 victimizes cache lines with the transient property for replacement with new data blocks. The cache at memory level N 203 detects M data blocks (Data 101 to Data (100+M)) prefetched to the cache at memory level N 203. The cache at memory level N 203 replaces M transient cache lines (Data 1 to Data M) with M prefetched data blocks (Data 101 to Data (100+M)). The cache at memory level N 203 replaces cache lines with the transient property instead of replacing any cache lines without the transient property. The cache at memory level N 203 makes a replacement decision taking into account the transient property of cache lines as well as a standard replacement policy (e.g., LRU (Least Recently Used), MRU (Most Recently Used), etc.). For example, there are P cache lines with the transient property in the cache at memory level N 203, and M of the P cache lines are to be victimized for replacement (P>M). The cache at memory level N 203 determines the M cache lines of the P transient cache lines to be replaced in accordance with the standard replacement policy.

At stage G, the processor core 201 resets the transient bit in the transience register. For example, the processor core 201 executes a program instruction to reset the transient bit. Embodiments can have the transience register with a not transient bit. In such an implementation, the processor core 201 indicates to the prefetch engine 109 to generate prefetch requests for cache lines of the data streams without a transient attribute by setting the not transient bit.

At stage H, the prefetch engine 109 generates prefetch requests without a transient attribute. The prefetch engine 109 writes the prefetch requests to the prefetch request queue which sends the prefetch requests to prefetch data blocks from the memory at memory level N+1 205 into cache lines of the memory at level N 203. The prefetch engine 109 can send one or more prefetch requests to the memory at memory level N+1 205 at the same time. In the depicted embodiment, the prefetch engine 109 sends prefetch requests to prefetch R data blocks (Data 201 to Data (200+R)).

At stage I, the memory at memory level N+1 205 responds with data blocks. The memory at memory level N+1 205 sends the data blocks to the cache at memory level N 203. The data blocks sent by the memory at memory level N+1 205 do not have the transient attribute attached with the prefetch requests for respective data blocks. The memory at memory level N+1 205 may respond with one or more data blocks at the same time. In the depicted embodiment, the memory at memory level N+1 205 responds with R data blocks (Data 201 to Data (200+R)) at the same time.

At stage J, the cache at memory level N 203 writes data blocks to cache lines and sets properties of cache lines in accordance with a standard replacement policy. The cache at memory level N 203 writes the data blocks (Data 201 to Data (200+R)) to R cache lines (Data 201 to Data (200+R)). The cache at memory level N 203 sets the properties of R cache lines in accordance with the standard replacement policy. For example, a standard replacement policy specifies to set the property of a cache line as most recently used. The cache at memory level N 203 replaces R cache lines (Data 201 to Data (200+R)) in accordance with the standard replacement policy.

An anticipation module can also anticipate the stream length of a data stream and set the value of the stream length field in the length register. The stream length field in the length register indicates to a prefetch engine, the stream length limit of data streams to be prefetched henceforth. The stream length field in the length register can be set with a single instruction and reset with a single instruction. The use of a single instruction saves programming overhead and usage of general purpose registers. The single program instruction allows a developer to omit program instructions for setting the stream length limit for multiple data streams. The single program instruction also reduces execution time and processing overhead in the execution of the program. The length register enables setting a limit on the number of cache lines to be prefetched for multiple data streams.

Figure 3:
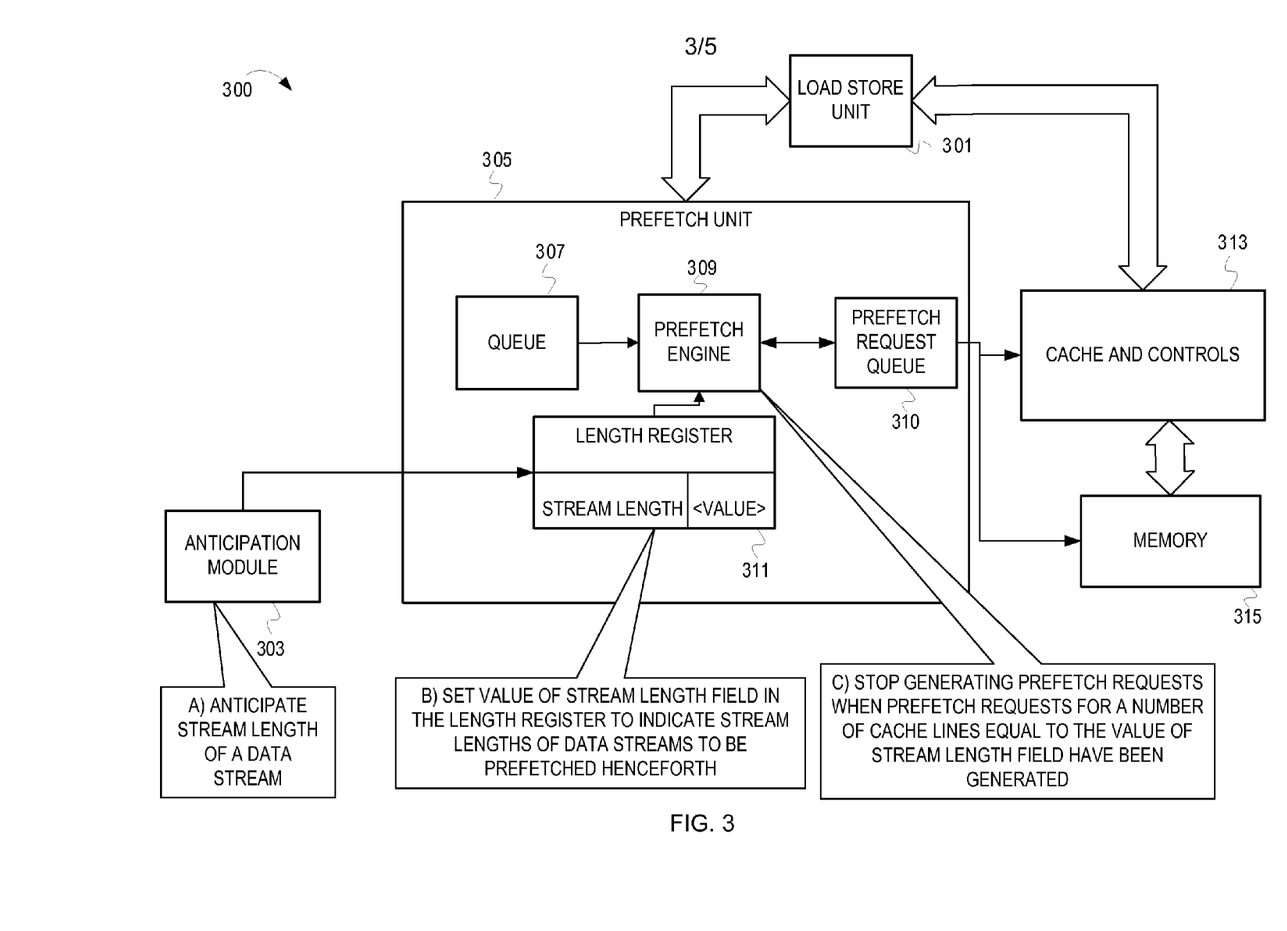
FIG. 3 depicts an example conceptual diagram of selected components of a microprocessor system to set a stream length limit for prefetch data streams using a length register.

FIG. 3 depicts an example conceptual diagram of selected components of a microprocessor system to set a stream length limit for prefetch data streams using a length register. FIG. 3 depicts a microprocessor system 300 including a prefetch unit 305, an anticipation module 303, a load store unit 301, cache and controls 313 and a memory 315. The prefetch unit 305 includes a queue 307, a prefetch engine 309, a prefetch request queue 310 and a length register 311. The prefetch engine 309 in the prefetch unit 305 performs operations to detect streams and to generate prefetch requests for cache lines that comprise those streams. The prefetch requests include requests for blocks of data from the memory 315 or one of the caches (e.g., cache and controls 313) in a memory hierarchy. The prefetch engine 309 in the prefetch unit 305 performs operations to generate prefetch requests for cache lines in the cache and controls 313. The prefetch requests include requests for blocks of data from the memory 315. The cache and controls 313 may be cache and controls for any level of cache in the microprocessor system 300 (e.g., L1 cache, L2 cache, etc.). The cache and controls 313 include a cache with controls for operations like implementing cache replacement policies, cache hit/miss update requests, etc. The memory 315 is the next higher level memory to the cache and controls 313 in the memory hierarchy. The load store unit 301 includes a pipelined execution unit to retrieve data from and store data to the memory hierarchy of the microprocessor system 300. Although not depicted in the figure, the prefetch unit 305 may be embodied in the load store unit 301. The queue 307 in the prefetch unit 305 buffers addresses generated by the load store unit 301. The prefetch request queue 310 in the prefetch unit 305 includes stream registers to store parameters of data streams. The length register 311 in the prefetch unit 305 indicates an upper limit for number of cache lines to be prefetched for data streams. The length register 311 includes a stream length field. The length register 311 is accessible at least for write access by the particular instructions generated by the anticipation module 303. The anticipation module 303 can be a compiler or program code that anticipates the length of data streams consumed by an application program, within a given window of time and/or number of instructions. The prefetch engine 309 reads the value of the stream length field to determine whether to limit generation of prefetch requests for data streams. The prefetch engine 309 writes the prefetch requests to the prefetch request queue 310 which are sent to prefetch data blocks from the memory 315 or one of the caches in the memory hierarchy. Multiple levels of caches in the memory hierarchy are checked for availability of the data blocks before the data blocks are prefetched from the memory 315.

The anticipation module 303 generates program instructions to set or reset the stream length field. The anticipation module 303 can be a compiler or program code that anticipates the stream length of data streams consumed by an application program, within a given window of time and/or number of instructions. The anticipation module 303 can also be one or more components of a hardware data stream prefetcher where the components anticipate the stream length of data streams. FIG. 3 depicts interactions between the components of the microprocessor system 300 in a sequence of stages A through C.

At stage A, the anticipation module 303 anticipates the stream length of a data stream. The anticipation module 303 includes program instructions inserted by a developer to set and reset the value of the stream length field based on knowledge of the application program data access patterns. For example, an application program accepts the size of an array from the user. The application program includes multiple for loops and iterations of the for loops are based on the size of the array. The program instructions set the value of the stream length field as the size of the array. In some embodiments, the anticipation module 303 can be a compiler. The compiler determines the stream length of a data stream to be utilized by the application program at compile time. The compiler inserts program instructions in the application program to set and reset the length register 311. In some implementations, the anticipation module 303 is a hardware data stream prefetcher. The hardware data stream prefetcher determines the stream length of a data stream to be utilized by the application program, and generates program instruction to set and reset the length register 311. Although, not depicted in the figure, the anticipation module 303 may be interfaced to the load store unit 301 and/or the queue 307 to receive information for anticipating the stream length of data streams.

At stage B, the anticipation module 303 sets the value of the stream length field to indicate stream lengths of data streams to be prefetched henceforth. The anticipation module 303 can interact with the components of the prefetch unit 305 to determine when the prefetch engine 309 starts generating prefetch requests for certain data streams to be utilized by the application program. The anticipation module 303 generates a program instruction to set the value of the stream length field. The value of the stream length field indicates to the prefetch engine 309 to limit generation of prefetch requests for cache lines of all data streams to be prefetched henceforth. In some embodiments, the length register 311 includes a single stream length field for hardware-acquired data streams and software-defined data streams. In other implementations, the length register 311 includes separate stream length fields for the hardware-acquired data streams and the software-defined data streams. The anticipation module 303 can set the appropriate stream length field in the length register 311 to indicate to the prefetch engine 309 about the stream length of the respective data streams (i.e., hardware-acquired data streams or software-defined data streams). The separate fields in the length register 311 for hardware-acquired data streams and software-defined data streams allow specification of the stream length limit of respective data streams in an efficient and flexible manner. In some embodiments, when the stream lengths of different data streams are nearly the same, the anticipation module 303 sets the value of the stream length field as the stream length of the longest stream. In some embodiments, the anticipation module 303 adds a margin value to the anticipated stream length of a data stream when setting the value of the stream length field. In some embodiments, the anticipation module 303 sets the value of the stream length field based on the ratio of length and depth of a data stream. Depth of a data stream is the number of data blocks that are prefetched ahead of the data block currently being utilized. For example, when the depth of a data stream is 20 and the length of the data stream is 100, the anticipation module 303 sets the value of the stream length field. However, when the depth of a data stream is 2 and the length of the data stream is 50, the anticipation module 303 does not set the value of the stream length field as the overshoot is small.

At stage C, the prefetch engine 309 stops generating prefetch requests when prefetch requests for a number of cache lines equal to the value of the stream length field have been generated. The prefetch engine 309 limits the stream length for each of the data streams to a number equal to the value of the stream length field. The prefetch engine 309 reads the value of the stream length field from the length register 311 when a data stream is acquired for prefetching. When the application program is consuming data blocks of the data stream, the prefetch engine 309 prefetches data blocks ahead of the data blocks currently being utilized. The prefetch engine 309 stops generating prefetch requests for more data blocks, when prefetch requests for a number of data blocks equal to the value of the stream length field have been generated. The prefetch engine 309 avoids overshoot and limits prefetching of data blocks that are not utilized by the application program. When the stream length of a data stream is less than the value of the stream length field, the prefetch engine 309 only generates number of prefetch requests for cache lines equal to the stream length and not equal to the value of the stream length field. In some embodiments, the prefetch engine 309 continuously monitors the stream length field. When the value of the stream length field is set while prefetch of a data stream is in progress, the prefetch engine 309 limits the stream length of the data stream if the number of cache lines already prefetched is less than the value of the stream length field. For example, at a time instance the value of the stream length field is set as 75 and 45 cache lines have already been prefetched for a data stream. The prefetch engine 309 limits the stream length for the data stream and stops prefetching cache lines when 75 cache lines have been prefetched for the data stream. The length register 311 allows the prefetch engine 309 to limit the stream length of a data stream without the knowledge of the starting address of the data stream. The prefetch engine 309 can limit the stream length of the data stream after the data stream is acquired. The length register 311 also allows the prefetch engine 309 to limit the stream length of data streams for which prefetch is in progress.

Figure 4:
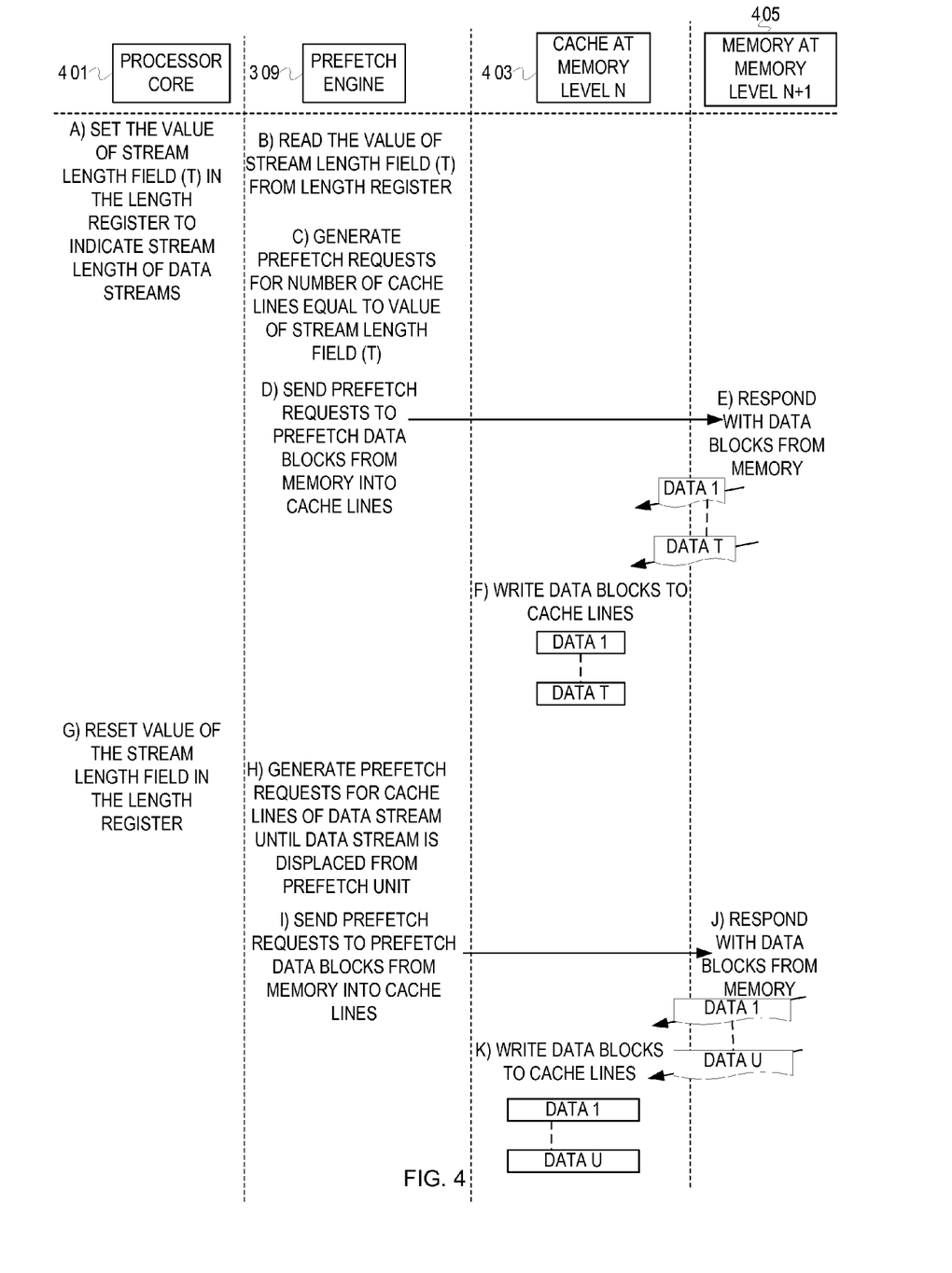
FIG. 4 depicts an example sequence diagram of interaction between components of a microprocessor system to set a stream length limit for prefetch data streams.

FIG. 4 depicts an example sequence diagram of interaction between components of a microprocessor system to set a stream length limit for prefetch data streams. FIG. 4 includes multiple entities including a processor core 401, a prefetch engine 309, a cache at memory level N 403 and a memory at memory level N+1 405. The processor core 401 includes components of a microprocessor (e.g., integrated circuits, registers, etc.) to execute program instructions. In the depicted embodiment, the processor 401 executes a program instruction to set a stream length field in a length register. The prefetch engine 309 performs operations to generate prefetch requests for the cache at memory level N 403. The cache memory at level N 403 includes a cache with controls for implementing cache replacement policies, cache coherence protocols, etc. The memory at memory level N+1 405 may be another cache or main memory. The memory at memory level N+1 405 is one level higher to the cache memory at level N 403 in the memory hierarchy. FIG. 4 depicts interactions between the components of the microprocessor system in a sequence of stages A through K. Stages A through F depict interactions between the components of the microprocessor system when a stream length field in a length register is set. Stages G through K depict interactions between components of the microprocessor system when the stream length field in the length register is reset.

At stage A, the processor core 401 sets the value of the stream length field as T (where T is a non-negative integer) in the length register to indicate stream length of data streams. For example, the processor core 401 executes a program instruction to set the value of the stream length field.

At stage B, the prefetch engine 309 reads the value of the stream length field (T) from the length register. For example, the prefetch engine 309 reads the value of the stream length field (T) when a data stream is acquired for prefetching. The prefetch engine 309 utilizes the value of the stream length field (T) to limit the stream length of the data stream to be prefetched. In some embodiments, the prefetch engine 309 constantly monitors the stream length field. The prefetch engine 309 utilizes the value of the stream length field (T) to limit the stream length of data streams that are being prefetched.

At stage C, the prefetch engine 309 generates prefetch requests for a number of cache lines equal to the value of the stream length field (T). The prefetch engine 309 limits the stream length of all data streams to be prefetched to T. For each of the data streams, the prefetch engine 309 stops generating prefetch requests when prefetch requests for T cache lines have been generated. The prefetch engine 309 continues to limit the stream length of all data streams acquired for prefetching, when the value of the stream length field is set. In some embodiments, when the value of the stream length field is reset after a data stream is acquired and prefetch for the data stream is in progress, the prefetch engine 309 does not limit the stream length of the data stream being prefetched.

At stage D, the prefetch engine 309 sends prefetch requests (generated at stage C) to prefetch data blocks from the memory at memory level N+1 405 into cache lines of the cache at memory level N 403. The prefetch engine 309 writes the prefetch requests to a prefetch request queue which sends the prefetch requests to prefetch data blocks from the memory at level N+1 405. The prefetch request queue can send multiple prefetch requests to the memory at memory level N+1 405 at the same time. In the depicted embodiment, the prefetch engine 309 sends prefetch requests to prefetch T data blocks (Data 1 to Data T). Although depicted as occurring in sequence, the operations of stages C and D can occur in parallel. For example, the prefetch request queue does not wait to send prefetch requests to the memory at memory level N+1 405 until all prefetch requests have been generated. The prefetch request queue can send one or more prefetch requests to the memory at memory level N+1 405 as the prefetch requests are generated.

At stage E, the memory at memory level N+1 405 responds with data blocks. The memory at memory level N+1 405 sends the data blocks to the cache at memory level N 403. The memory at memory level N+1 405 may respond with one or more data blocks at the same time. In the depicted embodiment, the memory at memory level N+1 405 responds with T data blocks (Data 1 to Data T) at the same time.

At stage F, the cache at memory level N 403 writes the data blocks to cache lines. The cache at memory level N 403 writes the data blocks to cache lines as they are received from the memory at memory level N+1 405. In the depicted embodiment, the cache at memory level N 403 writes T data blocks (Data 1 to Data T) to T cache lines (Data 1 to Data T).

At stage G, the processor core 401 resets the value of the stream length field in the length register. For example, the processor core 401 executes a program instruction to reset the value of the stream length field. The processor core 401 indicates to the prefetch engine 309 not to limit stream lengths of data streams to be prefetched by resetting the value of the stream length field. In some embodiments, the processor core 401 executes a program instruction generated by a compiler at compile time to reset the value of the stream length field.

At stage H, the prefetch engine 309 generates prefetch requests for cache lines of a data stream number until the data stream is displaced from a prefetch unit. The prefetch engine 309 does not limit the number of cache lines to be prefetched for the data stream. The prefetch engine 309 continues prefetching cache lines of the data stream until the data stream is displaced from the prefetch unit. A data stream is displaced from the prefetch unit, when the data stream is no longer utilized by an application program. The prefetch engine 309 also stops prefetching cache lines for the data stream on reaching the end of the memory page, when no more data blocks can be prefetched. The prefetch engine 309 continues to prefetch all data streams, which are acquired when the value of the stream length field is reset, without a limit on the number of cache lines. In some embodiments, when the value of the stream length field is set after a data stream is acquired and prefetch for the data stream is in progress, the prefetch engine 309 limits the stream length of the data stream if the number of cache lines that have already been prefetched is less than the value of the stream length field.

At stage I, the prefetch engine 309 sends prefetch requests (generated at stage H) to prefetch data blocks from the memory at memory level N+1 405 into cache lines of the cache at memory level N 403. The prefetch engine 309 writes the prefetch requests to a prefetch request queue which sends the prefetch requests to prefetch data blocks from the memory at level N+1 405. The prefetch request queue can send multiple prefetch requests to the memory at memory level N+1 405 at the same time. In the depicted embodiment, the prefetch request queue sends prefetch requests to prefetch U data blocks (Data 1 to Data U). Although depicted as occurring in sequence, the operations of stages H and I can occur in parallel. For example, the prefetch request queue does not wait to send prefetch requests to the memory at memory level N+1 405 until all prefetch requests have been generated. The prefetch request queue can send one or more prefetch requests to the memory at memory level N+1 405 when the prefetch requests are generated.

At stage J, the memory at memory level N+1 405 responds with data blocks. The memory at memory level N+1 405 sends the data blocks to the cache at memory level N 403. The memory at memory level N+1 405 may respond with one or more data blocks at the same time. In the depicted embodiment, the memory at memory level N+1 405 responds with U data blocks (Data 1 to Data U) at the same time.

At stage K, the cache at memory level N 403 writes the data blocks to cache lines. In the depicted embodiment, the cache at memory level N 403 writes U data blocks (Data 1 to Data U) to U cache lines (Data 1 to Data U).

Those of ordinary skill in the art should understand that entities and operations depicted in the conceptual diagrams of FIGS. 1 and 3 as well as the sequence diagrams of FIGS. 2 and 4 are examples to aid in understanding the inventive subject matter, and should not be used to limit the scope of the claims. Embodiments can perform additional operations not depicted, fewer than the depicted operations, the operations in a different order, the operations in parallel, etc. For example, a prefetch engine can generate prefetch requests for one cache line, multiple cache lines, cache lines of one data stream or cache lines of multiple data streams in response to reading a transient bit. In some embodiments, the prefetch engine associates a transient attribute with prefetch requests for remaining cache lines of a data stream when the transient bit is reset before prefetch requests for all cache lines of the data stream are generated.

Although, figures depict independent operations for setting a transient property for cache lines of data streams and setting a stream length limit for data streams, the operations of setting the transient property and setting the stream length limit can be performed at the same time. A transience register and a length register can co-exist in a prefetch unit. An anticipation module can set one or both of a transient bit and the value of a stream length field. A prefetch engine can limit prefetching the number of cache lines for a data stream equal to the value of the stream length field and prefetch the cache lines with the transient property. Although the description refers to setting prefetch indicators for a core, embodiments are not so limited. In some embodiments, transience or length can be set per thread. When a processor implements multi-threading in a processor core, the processor can maintain separate transient bits/flags for each of multiple threads in a transience register(s). The transience bit/flag for a thread can be indicated in a special purpose register, a general purpose register, or a block of memory assigned to the thread. In some embodiments, a single register can host transient indications for multiple threads. A processor can designate each bit position of the register to a different thread. Similarly, a processor can maintain separate stream length limits for each of the threads. A processor can indicate a stream length limit for a thread in a general purpose register(s), special purpose register(s), or a block of memory assigned to the thread. An anticipation module can appropriately set the transient bit and/or the length field for a particular thread.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to sequence diagram illustrations and/or block diagrams of methods, apparatus (systems) and computer program products according to embodiments of the inventive subject matter. It will be understood that each stage of the sequence diagram illustrations and/or block diagrams, and combinations of blocks in the sequence diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the sequence diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the sequence diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
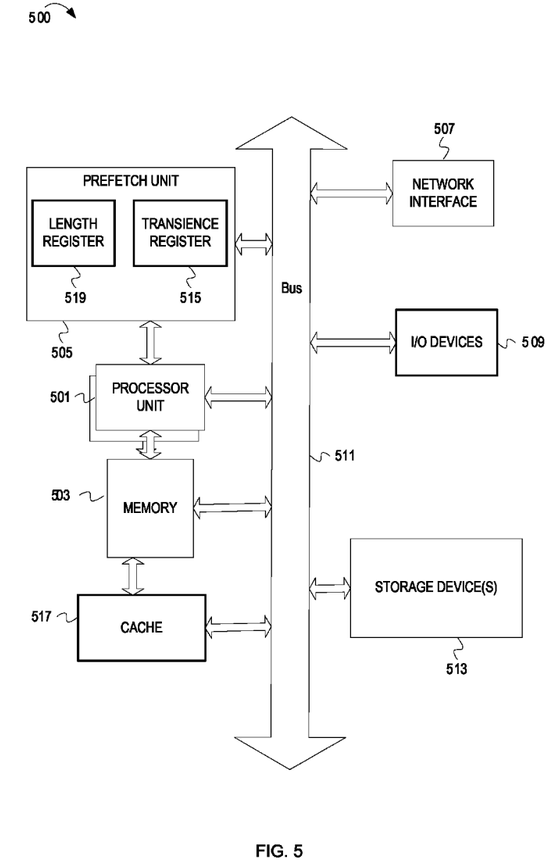
FIG. 5 depicts an example computer system.

FIG. 5 depicts an example computer system with a prefetch unit adapted for persistent prefetch settings for streams. A computer system includes a processor unit 501 (possibly including multiple processors, multiple cores, multiple nodes, and/or implementing multi-threading, etc.). The computer system includes memory 503. The memory 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 511 (e.g., PCI, ISA, PCI-Express, HyperTransport®, InfiniBand®, NuBus, etc.), I/O devices 509 (e.g., keyboard, mouse, monitor, microphone, speaker, etc.), a network interface 507 (e.g., an ATM interface, an Ethernet interface, a Frame Relay interface, SONET interface, wireless interface, etc.), a cache 517 (e.g., a direct mapped cache, a 2-way set associative cache, a fully associative cache, etc.), a prefetch unit 505, a transience register 515, a length register 519 and a storage device(s) 513 (e.g., optical storage, magnetic storage, etc.). The cache 517 may be a lower level cache (e.g., L1 cache embodied in a processor) or a higher level cache (e.g., L2 cache, L3 cache, etc.). The cache 517 includes a cache controller to implement cache replacement algorithms, setting the transient property for cache lines, cache coherence protocols, etc. The cache 517 is directly coupled with the memory 503. The prefetch unit 505 includes a prefetch engine, one or more prefetch queues, etc. The prefetch unit 505 is coupled to the processor unit 501. The prefetch unit 505 generates prefetch requests to prefetch data blocks from the memory 503 into the cache 517. The prefetch unit 505 may be embodied in the processor unit 501. The transience register 515, embodied in the prefetch unit 505, indicates to the prefetch engine to associate a transient attribute with prefetch requests of cache lines. The length register 519, embodied in the prefetch unit 505, indicates to the prefetch engine to limit the stream length of data streams to be prefetched. The transience register 515 and the length register 519 may be embodied in the memory 503, the storage device(s) 513 or may be directly coupled to the bus 511. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 513, the network interface 507, the cache 517, the prefetch unit 505 and the I/O devices 509 are coupled to the bus 511. Although illustrated as being coupled to the bus 511, the memory 503 may be coupled to the processor unit 501.

While the embodiments are described with reference to various implementations and exploitations, it will be understood that these embodiments are illustrative and that the scope of the inventive subject matter is not limited to them. In general, techniques for setting persistent prefetch indicators for data streams as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A system comprising:
   a processor core;
   cache coupled with the core;
   a transience register adapted to host an indication of transient for data stream prefetching;
   a prefetch unit adapted to monitor the transience register and adapted to generate prefetch requests of data streams with an indication of transient when the transience register indicates transient for data stream prefetching and adapted to generate prefetch requests without the indication of transient when the transience register does not indicate transient;
   a cache controller coupled with the prefetch unit, the cache controller adapted to implement a cache replacement policy and cache coherence protocol, adapted to write data supplied from memory responsive to the prefetch requests into the cache with an indication of transient, and adapted to victimize cache lines of the cache with an indication of transient independent of the cache replacement policy.

2. The system of claim 1, wherein the transience register is set by a single program instruction to host the indication of transient for data stream prefetching, wherein the single program instruction is based on data access patterns of an application program.

3. The system of claim 1, wherein the indication of transient for data written into the cache indicates that the data can be victimized from the cache after a single hit in the cache.

4. The system of claim 1, wherein the prefetch unit is adapted to continue to generate prefetch requests for data streams with the indication of transient until the transience register is set or reset with an indication of not transient.

5. The system of claim 1, wherein the indication of transient persists when the data streams are prefetched across multiple levels of a memory hierarchy.

6. The system of claim 1 further comprising the memory, which is adapted to write the indication of transient into metadata of the data when supplying the data responsive to prefetch requests with the indication of transient.

7. A system comprising:
   a processor core;
   cache coupled with the processor core;
   a transience register adapted to host an indication of transient for data stream prefetching;
   a length register adapted to host an indication of a stream length limit for data stream prefetching;
   a prefetch unit adapted to monitor the transience register and the length register, the prefetch unit adapted to generate prefetch requests of data streams with a transient property up to the stream length limit when the transience register indicates transient and the length register indicates the stream length limit for data stream prefetching; and a cache controller coupled with the prefetch unit, the cache controller adapted to implement a cache replacement policy and cache coherence protocol, adapted to write data supplied from a memory responsive to the prefetch requests into the cache with an indication of transient, and adapted to victimize cache lines with an indication of transient independent of the cache replacement policy.

8. The system of claim 7, wherein the length register is set by a single program instruction to host the indication of the stream length limit for data stream prefetching, wherein the single program instruction is based on data access patterns of an application program.

9. The system of claim 7, wherein the prefetch unit is adapted to continue to generate prefetch requests for data streams up to a maximum of the stream length limit until the length register is set or reset with an indication of no stream length limit.

10. The system of claim 7, wherein the prefetch unit is adapted to generate prefetch requests for data streams without restrictions of the stream length limit when the length register is reset.

11. The system of claim 7, wherein the indication of transient persists when the data streams are prefetched across multiple levels of a memory hierarchy of the system.

12. The system of claim 7 further comprising the memory, which is adapted to write the indication of transient into metadata of the data when supplying the data responsive to prefetch requests with the indication of transient.

13. A method of operating a processor for prefetching data, the method comprising:

setting a first register to indicate a first value, wherein the first value indicates that a data stream is a transient data stream, wherein a transient data stream is a data stream that is accessed a limited amount;

generating prefetch requests with an indication of transient while the first register indicates the first value;

writing data supplied responsive to the prefetch requests into cache along with the indication of transient, wherein the data is supplied with the indication of transient; and victimizing cache lines of the cache with the indication of transient, wherein said victimizing is independent of a cache replacement policy applied to the cache.

14. The method of claim 13 further comprising:

setting the first register to indicate a second value; and generating prefetch requests without the indication of transient while the first register indicates the second value.

15. The method of claim 13, wherein said setting the first register to indicate the first value comprises setting the first register responsive to a program instruction directing the processor to set the first register to indicate the first value.

16. The method of claim 13 further comprising:

setting a second register to indicate a stream length limit; and prefetching up to the stream length limit while the second register indicates the stream length limit.

17. The method of claim 16, wherein the data stream is a software defined data or a hardware defined data stream.

18. The method of claim 13 further comprising:

for each of the prefetch requests, generating a response with data requested by the prefetch request and with metadata that indicates transient.

19. The method of claim 13, wherein the limited amount is a single use within a period defined by one of time, memory accesses, and number of instructions.

20. The method of claim 13 further comprising:

setting a second register to indicate the first value corresponding to a second data stream, wherein the data stream corresponds to a first thread and the second data stream corresponds to a second thread; and generating prefetch requests for the second thread with the indication of transient while the second register indicates the first value.

\* \* \* \* \*